United States Patent [19]

Vaughn et al.

[11] 4,181,566

[45] Jan. 1, 1980

[54] CELLULOSIC MATERIALS INTERNALLY SIZED WITH AMMONIATED ACID COPOLYMERS AND EPIHALOHYDRIN/ALKYLAMINE REACTION PRODUCTS

[75] Inventors: Walter L. Vaughn, Lake Jackson; James A. Allen, Clute, both of Tex.

[73] Assignee: The Dow Chemical Company, Midland, Mich.

[21] Appl. No.: 684,223

[22] Filed: May 7, 1976

Related U.S. Application Data

[63] Continuation of Ser. No. 497,581, Aug. 15, 1974, abandoned.

[51] Int. Cl.² .............................................. D21H 3/40
[52] U.S. Cl. ......................... 162/164 EP; 162/168 N; 162/168 NA
[58] Field of Search ........ 162/168 R, 168 N, 164 EP; 526/317, 16, 49; 260/17.4 CL

[56] References Cited

U.S. PATENT DOCUMENTS

| 2,694,629 | 11/1954 | Reynolds | 162/164 |
|---|---|---|---|
| 3,248,353 | 4/1966 | Coscia | 162/164 |
| 3,409,500 | 11/1968 | Strazdins et al. | 162/164 |
| 3,821,069 | 6/1974 | Wurzburg | 162/158 |

OTHER PUBLICATIONS

Union Carbide Brochure F-42958 "Products for Paper-PCX-300 An Alkali-Dispersible Ethylene Copolymer" pp. 1–14, printed 10/70.

*Primary Examiner*—S. Leon Bashore
*Assistant Examiner*—William F. Smith

[57] ABSTRACT

Cellulosic materials such as paper are internally sized by treating fibers of the cellulosic material, e.g., paper pulp, with a copolymer of an $\alpha,\beta$-ethylenically unsaturated hydrophobic monomer and an ammoniated $\alpha,\beta$-ethylenically unsaturated carboxylic acid and a reaction product of epihalohydrin and alkylamine. Internal sizing of the cellulosic material by this method can be carried out over complete range of pH and is not adversely affected by the presence of contaminants such as alum.

14 Claims, No Drawings

CELLULOSIC MATERIALS INTERNALLY SIZED WITH AMMONIATED ACID COPOLYMERS AND EPIHALOHYDRIN/ALKYLAMINE REACTION PRODUCTS

This is a continuation, of application Ser. No. 497,581 filed Aug. 15, 1974 now abandoned.

BACKGROUND OF THE INVENTION

This invention relates to internal sizing of cellulosic material over the complete range of pH conditions which are normally encountered in the cellulosic manufacturing arts.

Cellulosic materials such as paper and paperboard, are often sized with various materials with the purpose of increasing their resistance to water penetration as well as to penetration by other types of aqueous solutions. These materials are referred to as sizes or sizing agents and they may be introduced during the actual manufacture of the cellulosic material, e.g., paper making operation, wherein the process is known as internal sizing, often called beater sizing, wet end sizing or engine sizing. Surface sizing cellulosic materials by applying sizing agent to fabricated sheet or web is also well known; but is usually considered to be substantially different from internal sizing.

The basis of present internal sizing methods is the intimate coating of the individual fibers of the cellulosic material with a material which is insoluble in most materials and is repellent to water. For example, in manufacture of paper, the substance originally and still most widely used for this purpose is rosin or fatty acid. In order to insure the most intimate contact between the rosin and the pulp fiber, the former is added in either the dissolved state or as a finely dispersed emulsion. It is followed by a precipitating agent, usually aluminum sulfate, known to the paper maker as "alum". The alum coagulates the rosin, i.e., throws it out of solution or emulsion as a gelatinous precipitate. Since the rosin or emulsion is first mixed thoroughly with the pulp in the beater, the precipitate has a maximum chance of adhering to and being subsequently retained by the pulp. When the pulp is made into paper, the rosin in contact with the pulp adheres to the pulp as small particles, e.g., particles having diameters of one micron or less. The paper having the small particles of rosin adhered to the fibers exhibits the desired strength and ink and water resistance.

In addition to rosins, various water-repellent or hydrophobic materials have been utilized as internal sizing agents. These inclue fortified rosin, mixtures or rosins with waxes, wax emulsions, ketene dimer emulsions, fluorocarbons, fatty acid complexes of chromium or aluminum chlorides, long chain thermoplastic copolymers, as well as thermosetting condensation-type resins. Although all of these materials are effective under certain conditions, their use is nonetheless subject to one or more limitations.

For example, in the case of rosin, it is only useful as sizing agent in acidic solutions and therefore cannot be used for the sizing of neutral or alkaline pulps. Rosin is inoperable with the latter since it must ordinarily be used in combination with alum, or an acidic aluminum ion donor which is present for the purpose of precipitating and settling the metal rosinate onto the fibers. The use of alum for this purpose is, however, precluded under neutral or alkaline stock conditions. This is a definite disadvantage in paper making since paper produced from neutral or alkaline pulp has been found to have higher strenghth, greater stability and superior aging characteristics in comparison with paper prepared from acidic pulp. Also, the internal use of alkaline pigments such as calcium carbonate is precluded. This limitation also applies to most wax emulsions which cannot be used on the alkaline side since they are usually combined with small quantities of alum for the purpose of breaking the emulsions. On the other hand, it may be noted that certain sizing agents will not tolerate acidic conditions. In addition to the above described pH limitations, the water resistance or water holdout which is obtainable with many of the heretofore employed sizing agents is often inadequate for many applications which require paper or paperboard displaying an exceptionally high degree of water-resistance. Some sizing agents provide complete water repellency as opposed to the desired limited amount of water-resistance. Many sizing agents have been found to be incompatible with pigments, fillers or other ingredients which are often added to the paper or contaminants which are often present during conventional paper manufacture. A further disadvantage of some sizing agents is that a considerable degree of heat curing is required in order to develop full effectiveness.

For these and other reasons, it would be highly desirable to provide an internal sizing agent which can be effectively employed under acidic, neutral or alkaline conditions and which can be cured to a size having the desired limited water resistance under normal drying conditions used in the early stages of manufacturing paper and other cellulosic materials.

SUMMARY OF THE INVENTION

In the present invention, paper and other cellulosic materials are internally sized under pH conditions ranging from moderately acidic through strongly alkaline by an improved internal sizing method. In this improved method for internally sizing the cellulosic material wherein an internal sizing agent is applied to the fibers of the cellulosic material, the improvement comprises the use of a copolymer of an $\alpha,\beta$-ethylenically unsaturated hydrophobic monomer and an ammoniated $\alpha\beta$-ethylenically unsaturated carboxylic acid as an internal sizing agent and a reaction product of epihalohydrin and alkylamine or mixture thereof with ammonia as a cationic retention aid. The resultant internally-sized cellulosic material displays a very desirable degree of water-resistance along with resistance to acidic and alkaline solutions. Of prime importance is the fact that the successful use of the aforementioned copolymers as sizing agents in combination with the aforementioned cationic retention aid is not restricted to acidic pH which thus allows utilization of such sizing agents in the treatment of neutral and alkaline pulp as well as acidic pulp. Furthermore, the presence of contaminants, such as alum, during the drying and curing conditions which are used to develop the full sizing value of such internal sizing agents does not adversely affect the efficiency of the combined copolymer sizing agent and cationic retention aid.

DETAILED DESCRIPTION OF THE INVENTION

For the purpose of this invention, the term "cellulosic material" is meant to include paper, paper board and other fibrous, sheet-like or molded masses derived from wood, wood pulp, or cotton or other sources of cellulosic fibers. This term also includes sheet-like or molded masses prepared from combination of cellulosic materials and non-cellulosic materials such as polyamides, polyesters, polyacrylic acid resin fibers and mineral fibers such as asbestos, glass and the like.

By the term "internal-sizing" is meant a method of sizing in which the cellulosic material in raw form, e.g., fibrous stock such as paper pulp, is contacted with the sizing agent under conditions effective to size the cellulosic material, i.e., deposit the sizing agent on the fibers and cure it to full sizing effectiveness. Accordingly, it is understood that the term "internal sizing" is generic, and therefore includes such terms as "beater-sizing", "engine-sizing", "internal wet end sizing" and the like.

The internal sizing agents suitably employed in the practice of this invention are copolymers of $\alpha,\beta$-ethylenically unsaturated hydrophobic monomer and ammoniated $\alpha,\beta$-ethylenically unsaturated carboxylic acid, i.e., $\alpha,\beta$-ethylenically unsaturated carboxylic acid in the ammonium salt form. Generally, such copolymers are water-dispersible, semi-solid or solid materials. Advantageously such copolymers have molecular weights which give melt flow viscosities in the range from about 0.2 decigram-minute as measured by ASTM D-1238-65T(E) to about 50 decigrams/minute as measured using the procedure of ASTM D-1238-65T(B) except that in said procedure the orifice of the extrusion plastometer is 0.020 inch. Preferably, the copolymers has a melt flow viscosity in the range from about 0.5 to about 20 decigrams/minute as determined by ASTM D-1238-65T(B) using the plastometer with a 0.020 inch orifice. Preferred copolymers are also film-forming at temperatures used in the sizing operation. By "water-dispersible" is meant a material which can exist in the form of a stable aqueous colloidal dispersion in the absence of a surface active agent. In addition, the copolymers in the form of aqueous dispersions preferably form films under ambient conditions which films dry to form water-insoluble coatings. By $\alpha,\beta$-ethylenically unsaturated hydrophobic monomer is meant any water-immiscible monomer containing a terminal double bond capable of polymerization under normal conditions of addition polymerization to form a water-insoluble homopolymer having a polyethylenic backbone. By $\alpha,\beta$-ethylenically unsaturated carboxylic acid is meant an $\alpha,\beta$-ethylenically unsaturated carboxylic acid which is capable of addition copolymerization through the ethylenically unsaturated group with the $\alpha,\beta$-ethylenically unsaturated hydrophobic monomer. By ammoniated $\alpha,\beta$-ethylenically unsaturated carboxylic acid is meant that in the copolymer the carboxylic acid groups are neutralized with ammonia.

Preferably, the internal sizing agent is a normally solid, water- and alkali-insoluble thermoplastic addition copolymer in the form of a fluid aqueous colloidal dispersion. The occurrence of ammoniated acid groups in the polymer should be general throughout the macromolecules thereof so that each macromolecule contains a minimum number of active salt groups sufficient to render the polymer water-dispersible as defined hereinbefore. The maximum number of ammoniated acid groups which may be present in the macromolecules is fixed by the requirement that the molecule be substantially water-insoluble. Generally speaking, such copolymers contain from about 6 to about 40 weight percent of ammoniated acid comonomer, with preferred copolymers containing from about 10 to about 20 weight percent of ammoniated acid comonomer and especially preferred copolymers containing from about 15 to about 18 weight percent.

Exemplary preferred copolymers are the random copolymers products of copolymerization of mixtures of one or more polymerizable ethylenically unsaturated carboxylic acids having 3 to 8 carbon atoms inclusive of anhydrides and alkyl half esters of ethylenically unsaturated acids such as acrylic acid, methacrylic acid, maleic acid and anhydride, itaconic acid, fumaric acid, crotonic acid and citraconic acid and anhydride, methyl hydrogen maleate, ethyl hydrogen maleate, and one or more $\alpha,\beta$-ethylenically unsaturated hydrocarbon monomers such as the aliphatic $\alpha$-olefin monomers, e.g, ethylene, propylene, butene-1 and isobutene; conjugated dienes, e.g., butadiene and isoprene; and monovinylidene aromatic carbocyclic monomers, e.g., styrene, $\alpha$-methylstyrene, toluene, and t-butylstyrene. In addition, other ethylenically unsaturated hydrophobic monomers which are not entirely hydrocarbon are copolymerized with the aforementioned acid comonomers. Examples of such suitable monomers which are not entirely hydrocarbon include esters of $\alpha,\beta$-ethylenically unsaturated carboxylic acids such as ethyl acrylate, methyl methacrylate, ethyl methacrylate, methyl acrylate, isobutyl acrylate, and methyl fumarate; unsaturated esters of non-polymerizable carboxylic acids such as vinyl acetate, vinyl propionate, and vinyl benzoate; vinyl halides such as vinyl and vinylidene chloride; vinyl esters; $\alpha,\beta$-ethylenically unsaturated amides and nitriles such as acrylamide, acrylonitrile, methacrylonitrile and fumaronitrile. It is understood that the aforementioned suitable hydrophobic monomers may be copolymerized with preferred hydrocarbon monomer and the acid conomomer in proportions such that a water- and alkali-insoluble polymer is provided. Preferred copolymers include copolymers from about 70 to about 90 weight percent of ethylene, from about 10 to about 20 weight percent of one or more ammoniated ethylenically unsaturated acids such as acrylic acid and methacrylic acid and from 0 to about 20 weight percent of suitable ethylenically unsaturated hydrophobic monomer as described hereinbefore such as acrylonitrile, ethyl acrylate and vinyl acetate.

Other copolymers which are suitable are made from pre-formed, non-acid polymers by subsequent chemical reactions carried out thereon. For example, the carboxylic acid group may be supplied by grafting a monomer such as acrylic acid or maleic acid onto a polymer substrate such as polyethylene. Additionally, copolymers containing carboxylic anhydride, ester, amide, acylhalide and nitrile groups can be hydrolyzed to carboxylic acid groups which can then be neutralized to form the ammoniated carboxylic acid.

It is further understood that the $\alpha,\beta$-ethylenically unsaturated carboxylic acid in ammonium salt form may be copolymerized with the hydrophobic monomer in order to prepare a suitable copolymer.

Specified procedures and means for making the polymers are known to the art as exemplified by U.S. Pat. No. 3,520,861 to Thomson et al and U.S. Pat. No. 3,426,363 to Helin. In instances wherein the acid copolymer is obtained in mass form, the copolymer may be converted to aqueous colloidal dispersion in accordance with the methods of U.S. Pat. No. 3,389,109 to Harmon et al which is subsequently concentrated and ammoniated by the method described in U.S. Pat. No. 3,644,258 to Moore et al. Generally methods of producing the aqueous colloidal dispersion of a copolymer which require the use of little or no emulsifier or other surface active agents are preferred. Preferably, the aqueous colloidal dispersion of copolymer has a polymer solids content from about 5 to about 60 weight percent and sufficient stabilizing ammonia to give the dispersion a pH of at least about 7.5. High solids dispersions are suitably prepared from lower solids dispersions by the method disclosed in the aforementioned patent to Moore et al.

In order to obtain a degree of sizing which is useful in manufacture of sized paper (including highly sized paper), it is necessary to utilize the copolymer sizing agent of the present invention in conjunction with a reaction product of epihalohydrin and alkylamine having at least two amine hydrogens per molecule or a mixture of the alkylamine and ammonia, hereinafter collectively referred to as epihalohydrin/amine reaction product. These epihalohydrin/amine reaction products are useful as co-additives which enhance the retention of the copolymer sizing agent and which bring the copolymer sizing agent in closer proximity to the fibers of the cellulosic materials during the sizing operation. Suitable epihalohydrin/amine reaction products are water dispersible, i.e., they disperse readily in water without the aid of surfactants. Such reaction products may be water-soluble. In order to have preferred sizing effectiveness, the alkyl chain length of the alkylamine should be 10 to 22 carbon atoms. At lower chain lengths than 16 carbon atoms sizing effectiveness is reduced and at chain lengths of about 22 carbon atoms the alkylamine becomes increasingly difficult to emulsify. Preferred reaction products comprise from about 1 to about 2, especially from about 1.3 to about 1.7, mole of epihalohydrin per mole of amine, i.e., alkylamine or mixture thereof with ammonia. Such reaction products normally have molecular weights as determined by embulliometry in the range from a few hundred, e.g., about 200, up to several thousand, e.g., 60,000. Accordingly, low molecular weight dimers, trimers and other oligomers as well as high molecular weight cross-linked polymers are suitably employed. Most preferably low molecular weight oligomers having molecular weights in the range from about 400.

The reaction products are readily prepared by contacting with stirring the epihalohydrin and the alkyl amine in an appropriate carrier such as an alcohol under controlled conditions of temperature. Such reactions between amines and halohydrins are generally well known in the art and need not be further described here.

In the internal sizing of paper and other cellulosic materials using the above-described copolymers as internal sizing agents, a number of variations and techniques may be employed. It is critical, however, that all of the techniques employed achieve uniform dispersal of the sizing agent throughout the cellulosic fiber during internal sizing. Uniform dispersal may be obtained by adding the ammoniated copolymer sizing agent in a fully dispersed form such as an aqueous colloidal dispersion.

In instances where no alum is being used and the pH of the fiber stock is neutral or alkaline, the copolymer sizing agent and the epihalohydrin/amine reaction product are suitably added to the fiber stock in any order. Preferably the copolymer sizing agent is added to the fiber stock prior to the addition of the reaction product or simultaneously therewith or shortly thereafter, e.g., usually within 30 minutes. If the alum is to be employed and/or if pH of the fiber stock is acid, the reaction product should be added to the fiber stock before the copolymer sizing agent is added.

The actual addition to the cellulosic material fiber of the reaction product and/or the sizing agent may take place at any point in the cellulosic material manufacturing process prior to the ultimate conversion of wet-fibrous material into web, sheet or molded article. Thus, for example, in paper manufacture, the sizing agent may be added to the pulp while the latter is in the stuff box, fan pump, beater, hydropulper or stock chest, preferably in the stuff box or by fan pump addition.

In order to obtain good internal sizing, it is desirable that the ammoniated copolymer sizing agents be uniformly dispersed throughout the fiber in as small a particle size as is possible to obtain. One method for providing such uniform dispersions is to disperse the sizing agent in aqueous media prior to its addition to stock using, for example, a method as described hereinbefore. While it is generally desirable to use the ammoniated copolymer sizing agent in aqueous colloidal dispersion which is free of emulsifiers and surface active agents, such agents can be suitably employed in the practice of the invention provided that such agents are fugitive during sizing or otherwise do not impair the effectiveness of the copolymer sizing agent.

The copolymer agents employed in this invention are most successfully utilized for the sizing of paper prepared from all types of both cellulosic and combination of cellulosic with non-cellulosic fibers. The cellulosic fibers which may most advantageously be used include the bleached and unbleached sulfate (Kraft), bleached and unbleached sulfite, bleached and unbleached soda, neutral sulfite, semi-chemical, chemi-ground wood, ground wood and any combination of these fibers. These designations refer to wood pulp fibers which have been prepared by means of a variety of processes which are known in the pulp and paper industries.

It is understood that all types of additives such as pigments, fillers, stabilizers, additional retention aids, wet strength additives and dry strength additives, additional sizing agents, and the like may be employed in combination with the copolymer sizing agents and epihalohydrin/alkylamine reaction products employed in the present invention. Such additaments include kaolin clay, talc, titanium dioxide, calcium carbonate, diatomaceous earth, plastic pigments, aluminum trihydrate, and precipitated silica. In the practice of this invention, it is particularly desirable to employ from about 10 to about 50 pounds of alum per ton of dry cellulosic material.

The ammoniated copolymer sizing agents are suitably employed in amounts effective to achieve the purposes of the sizing such as water-resistance, i.e., an amount effective to size the cellulosic material. Generally, amounts falling within the range from about 0.005 to about 0.50 weight percent based on dry weight of the cellulosic material in the finished sheet or article are used, with amounts being in the range from about 0.1 to about 0.4 weight percent being preferred. It is understood that within this numerical range, the precise amount which is used will depend for the most part on the type of cellulosic material which is being employed, the specific operating conditions, as well as the particular end use for which the cellulosic material is destined. For example, paper which will require good water-resistance or ink holdout will necessitate the use of a higher concentration or sizing agent than a paper having characteristics which necessitate the use of only small amounts of sizing. Accordingly, any amount which is suitable to effect the desired end result of the sizing is suitable for the purpose of this invention.

These same factors also apply in relation to the amount of epihalohydrin/amine reaction product which is used in conjunction with ammoniated copolymer sizing agent. Thus, the skilled artisan will be able to use the reaction product and the sizing agent in any concentrations which is found to be applicable to the specific operating conditions of internally sizing cellulosic material as defined hereinbefore. However, as a general rule, the retention aid is usually employed in amount in the range from about 0.5 to about 3 weight parts per 1 weight part of copolymer sizing agent, preferably from about 1 to about 2 weight parts of retention aid per weight part of copolymer sizing agent.

The following examples are given to illustrate the preferred embodiments of the invention and should not be construed as limiting its scope. In these examples, all parts and percentages are by weight unless otherwise noted.

EXAMPLE 1

A 3.31 Kg portion of ethylene/acrylic acid (86/14) copolymer having a number average molecular weight of 4500 and a melt flow viscosity [ASTM D-1238-65T(B) using a plastometer having a 0.020" orifice] of 2 decigrams/minute is added to 2.33 liters of aqueous ammonia (28 percent $NH_3$) in a 37.8 liter kettle containing 28.4 liters of water. The foregoing ingredients are stirred for 3 hours at 100° C. and 45 psi, and the resulting dispersion is allowed to cool to room temperature. The dispersion is passed through gauze to remove flocculated material. The resulting filtrate is an aqueous dispersion containing 10 percent ethylene/ammonium acrylate copolymer solids.

A 1 liter reaction flask equipped with reflux condenser, stirrer, thermometer, and feeding funnel is charged with 100 g of octadecylamine dissolved in 100 grams of 95 percent ethanol and heated to 30° C. A 44.3 g portion of epichlorohydrin is added to the flask over a 15 minute period, and the contents of the flask are heated to 100° C. for four hours. The solvent is stripped from the final product by vacuum at slightly elevated temperature. The reaction product has a number average molecular weight (embulliometry) of 510 and contains the reactants in the form of a condensation product having a ratio of 1.4 moles of epichlorohydrin per mole of octadecylamine. An emulsion of the reaction product is readily prepared by boiling the product in distilled water for a few minutes.

Unbleached Kraft soft wood pulp is beaten to 425 SCF (Standard Canadian Freeness) on a valley beater at 1.5% consistency using TAPPI Standard T200 os 70. A 100 ml aliquot is taken from the resultant mixture and diluted to 800 ml by adding 700 ml water. While the diluted mixture is stirred, a 1 ml portion of 1 percent papermaker's alum (13.2 lb/ton based on dry pulp) is added, and the mixture is stirred for 5 minutes. A 3 ml portion of 0.075 percent solution of aforementioned epichlorohydrin/octadecylamine reaction product (3 lbs/ton based on dry pulp) is added to the pulp mixture which is stirred for 3 minutes. A 6 ml portion of the ethylene/ammonium acrylate copolymer latex (6 lbs/ton based on dry pulp) is added to the pulp mixture containing the reaction product and the pulp mixture is again stirred for 3 minutes. The pulp pH is adjusted to 5 using 0.1 N sulfuric acid and the pulp is then added to a deckle box of a TAPPI sheet mold containing 1 ml of 1 percent papermaker's alum. Several handsheets are formed in accordance with TAPPI Standard T205 os 71. The sheets are dried, cured and conditioned overnight according to TAPPI Standard (T400 os 70) (at 72° C. and 50 percent relative humidity). The sheets are tested for water resistance and ink penetration and the results are recorded in Table I.

For the purposes of comparison, several samples are made following the foregoing procedure except that different amounts of the copolymer sizing agent (E/AA) and epichlorohydrin/amine reaction product (EPI/ODA) are employed. Also a control sample (Sample No. C) is made wherein no EAA or EPI/ODA is employed. Handsheets are prepared using these samples and by following the foregoing procedure. The sheets are tested and results are also recorded in Table I.

TABLE I

| Sample No. | Additive (1), lb/ton | | Pulp pH | Ink Penetration (2) seconds | Cobb (3) $g/m^2$ | Contact Angle (4) |
| --- | --- | --- | --- | --- | --- | --- |
| | EAA (a) | EPI/ODA (b) | | | | |
| 1 | 2 | 2 | 5.0 | 309 | 35.2 | 94.5° |
| 2 | 2 | 4 | 5.0 | >1500 | 31.2 | 105.5° |
| 3 | 3 | 6 | 5.0 | >1500 | 11.2 | 111.5° |
| 4 | 3.5 | 7 | 5.0 | >1500 | 16.0 | 111.5° |
| 5 | 1.5 | 1.5 | 5.0 | 3.1 | 48.4 | 99.5° |
| 6 | 1 | 1 | 5.0 | 0.1 | 72.8 | 51° |
| 7 | 5 | 5 | 5.0 | >1500 | 18.8 | 115.0° |
| 8 | 5 | 8 | 5.0 | >1500 | 14.0 | 107.5° |
| C* | 0 | 0 | 5.1 | 0.1 | 90.4 | <20° |

*Not an example of the invention.
(a) Ammoniated ethylene/acrylic acid (86/14) copolymer.
(b) Epichlorohydrin/octadecylamine reaction product.
(1) Pounds of additive per ton of pulp on dry weight basis.
(2) Ink Penetration time in seconds to reach 80% reflectance determined using TAPPI Standard T4 31 ts 65 ink and Hercules Sizing Tester.
(3) Cobb test (TAPPI Standard T441 os 69) using exposure times of 120 seconds.
(4) TAPPI Standard T458 os 70 using distilled water.

EXAMPLE 2

Following the procedure of Example 1 except that different copolymer sizing agents are employed, several samples are prepared using additives at 5 lbs/ton of copolymer sizing agent and 5 lbs/ton of epichlorohydrin/octadecylamine and tested and the results are recorded in Table II.

TABLE II

| Sample No. | Copolymer Size (1) | Ink Penetration (2) | Cobb (3), g/m² | Contact Angle (4) |
| --- | --- | --- | --- | --- |
| 1 | E/AANH₄ (85/15) [30,000] | >1500 | 32.0 | 102.5° |
| 2 | E/EA/AANH₄ (67.5/14.7/17.8) [30,000] | " | 16.0 | 110.0° |
| 3 | E/AAK (56/44) [5400] | " | 19.6 | 101.5° |
| 4 | E/AANH₄ (80/20) [18,300] | " | 22.4 | 111.0° |
| 5 | EA/AANH₄ (90/10) [30,000] | " | 34.4 | 93.5° |
| 6 | E/AANa (60/40) [5000] | " | 58.8 | 109.5° |
| 7 | E/IBA/AANH₄ (67.5/16.7/15.8) [5,150] | " | 18.8 | 115.0° |

(1) E-ethylene, EA-ethyl acrylate, IBA-isobutyl acrylate, AANH₄-acrylic acid ammonium salt, AAk-acrylic acid potassium salt and AANa-acrylic acid sodium salt. Numbers in parenthesis represent weight percent of respective monomers and numbers in brackets represent number average molecular weight.
(2)–(3) Same as in Table I.
(4) Same as (4) in Table I except that TAPPI Standard T4 31 ts 65 ink is employed instead of distilled water.

EXAMPLE 3

Following the procedure of Example 2 using bleached kraft (50 percent hardwood, 50 percent soft wood), several samples are prepared using various amounts of additives as indicated in Table III. The samples in the form of handsheets are tested as indicated in Table III and the results are recorded therein.

EXAMPLE 5

A sample is prepared following the procedure of Example 1 except that a different epihalohydrin/alkylamine reaction product and varying amounts of additives as indicated in Table V are employed. In a similar manner two comparative samples are prepared except that one of the additives is omitted. The samples in the form of handsheets are prepared and tested in accordance with TAPPI Standard T205 os 71 and T402 os 70. The results are recorded in Table V.

TABLE III

| Sample No. | Additive (1), lb/ton EAA (a) | Additive (1), lb/ton EPI/ODA (b) | Alum | Pulp pH | Ink Penetration (2) seconds | Cobb (3) g/m² | Contact Angle (4) |
| --- | --- | --- | --- | --- | --- | --- | --- |
| 1 | 1.5 | 3.0 | 26.3 | 4.9 | 555 | 26.8 | 92° |
| 2 | 2.0 | 4.0 | 26.3 | 4.9 | >1500 | 18.8 | 105° |
| 3 | 4.0 | 4.0 | 26.3 | 4.9 | 1042 | 16.0 | 123° |
| 4 | 4.0 | 8.0 | 26.3 | 4.9 | >1500 | 16.8 | 118° |
| 5 | 6.0 | 12.0 | 0 | 7.0 | >1500 | 24.0 | 121° |
| 6 | 4.0 | 8.0 | 14.0 | 4.8 | >1500 | 16.0 | — |
| A₁* | 0.0 | 4.5 | 26.3 | 4.9 | 47 | 66.8 | 88° |
| A₂* | 0.0 | 3.0 | 26.3 | 4.9 | 0.5 | 130.8 | 38° |

*Not an example of the ivention.
(a)–(b) Same as in Table I.
(1)–(4) Same as in Table II.

EXAMPLE 4

Following the procedure of Example 3, a sample is prepared using amounts of additives in accordance with the invention as indicated in Table IV. For purposes of comparison, another sample is similarly prepared except that an epichlorohydrin/ammonia reaction product is used instead of the epichlorohydrin/alkylamine reaction product. The samples in the form of handsheets are tested as indicated in Table IV and the results are recorded therein.

TABLE V

| Sample No. | Additive (1), lb/ton EAA (a) | Additive (1), lb/ton EPI/TDA (b) | Alum | Pulp pH | Ink Penetration (2) seconds | Cobb (3) g/m² | Contact Angle (4) |
| --- | --- | --- | --- | --- | --- | --- | --- |
| 1 | 4.0 | 4.0 | 26.3 | 5.0 | >1500 | 15.2 | 113.5° |
| A* | 4.0 | 0 | 26.3 | 5.0 | 0.3 | 79.6 | 35° |
| B* | 0 | 4.0 | 26.3 | 5.0 | 4.3 | 21.6 | 83° |

*Not an example of the invention.
(a) Same as in Table I.
(b) Epichlorohydrin/tetradecylamine reaction product comprising 1.4 moles of epichlorohydrin per mole of tetradecylamine.
(1)–(4) Same as in Table II.

EXAMPLE 6

Several samples are prepared by generally following the procedure of Example 3, except that a clay filler and different amounts of other additives as indicated in

TABLE IV

| Sample No. | Additive (1), lb/ton EAA (a) | Additive (1), lb/ton EPI/ODA (b) | EPI/NH₃ (c) | Alum | Pulp pH | Ink Penetration (2) seconds | Cobb (3) g/m² |
| --- | --- | --- | --- | --- | --- | --- | --- |
| 1 | 5 | 8 | 0 | 14.0 | 4.9 | >1500 | 18.4 |
| A* | 5 | 0 | 8 | 14.0 | 4.9 | 0.7 | 117.2 |

*Not an example of the invention.
(a)–(b) Same as in Table I.
(c) Epichlorohydrin/ammonia reaction product having a mole ratio of 1.6 moles of epichlorohydrin per mole of ammonia and molecular weight peaks at 5,000 and 50,000 as determined by gel permeation chromatography.
(1)–(3) SAme as in Table I.

As evidenced by the data in Table IV, the sizing composition of the present invention which contains an epichlorohydrin/alkylamine reaction product has much superior tolerance of alum then do similar compositions containing different retention aids.

Table VI are employed. The samples in the form of handsheets (1.7 g., fully cured, bleached Kraft) are tested and the results are recorded in Table VI.

TABLE VI

| Sample No. | Additives (1), lb/ton | | Alum | Clay | Pulp pH | Ink Penetration (2) seconds | Cobb (3) g/m$^2$ | Opacity (5) | Brightness (6) |
|---|---|---|---|---|---|---|---|---|---|
| | EAA (a) | EPI/ODA (b) | | | | | | | |
| 1 | 4.0 | 4.0 | 26.3 | 0 | 4.9 | 1042 | 16.0 | 87.0 | 57.5 |
| 2 | 4.0 | 4.0 | 26.3 | 200 | 4.9 | >1500 | 19.6 | 89.2 | 77.3 |
| 3 | 3.0 | 3.0 | 26.3 | 200 | 4.8 | 1188 | 19.6 | 89.4 | 70.2 |

(a)–(b) Same as in Table I.
(1)–(3) Same as in Table I.
(5) TAPPI Standard Test Method T425 os 60.
(6) TAPPI Standard Test Method T425 os 58.

What is claimed is:

1. In a method for internal sizing of a cellulosic material wherein an internal sizing agent and a retention aid are applied to the fibers of the cellulosic material, the improvement wherein the internal sizing agent is a water-dispersible, water- and alkali-insoluble copolymer of an α,β-ethylenically unsaturated hydrophobic monomer and an ammoniated α,β-ethylenically unsaturated carboxylic acid and the retention aid is a water dispersible reaction product of epihalohydrin and an alkylamine or a mixture of an alkylamine and ammonia wherein the alkylamine has at least two amine hydrogens.

2. The improvement of claim 1 wherein the sizing agent is a copolymer of ethylene and from about 6 to 40 weight percent of an ammoniated α,β-ethylenically unsaturated carboxylic acid and is present in an amount in the range from about 0.005 to about 0.5 weight percent of copolymer based on the dry weight of the cellulosic material, the retention aid is a reaction product of from 1 to 2 moles of epihalohydrin and a mole of alkylamine having from 10 to 22 carbon atoms and is present in an amount in the range from about 0.5 to about 3 weight parts per weight part of said copolymer, alum is added in an amount in the range from about 10 to about 50 pounds per ton of cellulosic material and the cellulosic material is pulp, said reaction product being added to the cellulosic material prior to the sizing agent.

3. The improvement of claim 2 wherein the reaction product has a number average molecular weight in the range from about 200 to about 60,000.

4. The improvement of claim 3 wherein said sizing agent is an ammoniated copolymer of ethylene and acrylic acid containing from about 10 to about 20 weight percent of the ammoniated acid comonomer and is present in an amount in the range from about 0.1 to about 0.4 weight percent of the copolymer based on the cellulosic material, said retention aid is a reaction product of epichlorohydrin and octadecylamine and is present in an amount in the range from about 1 to about 2 weight parts per weight part of said copolymer, and said cellulosic material is pulp.

5. The improvement of claim 1 wherein the cellulosic material is pulp.

6. The improvement of claim 1 wherein the hydrophobic monomer is an ethylenically unsaturated hydrocarbon.

7. The improvement of claim 1 wherein the sizing agent is an ammoniated copolymer of ethylene and acrylic acid and the retention acid is the reaction product of epichlorohydrin and octadecylamine.

8. The improvement of claim 1 wherein alum is added to the cellulosic material in an amount in the range from about 10 to about 50 pounds per ton of dry cellulosic material.

9. The improvement of claim 1 wherein said copolymer contains from about 6 to about 40 weight percent of the ammoniated acid comonomer, said sizing amount is within the range from about 0.005 to about 0.5 weight percent of copolymer based on dry weight of the cellulosic material and said retaining amount is within the range from about 0.5 to about 3 weight parts per weight part of said copolymer.

10. A cellulosic material internally sized with water-dispersible, water- and alkali-insoluble copolymer of an α,β-ethylenically unsaturated hydrophobic monomer and an ammoniated α,β-ethylenically unsaturated carboxylic acid, and a water-dispersible reaction product of epihalohydrin and alkylamine or a mixture of an alkylamine and ammonia wherein the alkylamine has at least two amine hydrogens.

11. The cellulosic material of claim 10 wherein said copolymer contains from about 6 to about 40 weight percent of the ammoniated acid comonomer, said sizing amount is within the range from about 0.005 to about 0.5 weight percent of copolymer based on dry weight of the cellulosic material and said retaining amount is within the range from about 0.5 to about 3 weight parts per weight part of said copolymer.

12. The cellulosic material of claim 11 wherein said copolymer contains from about 10 to about 20 weight percent of the ammoniated acid comonomer, said sizing amount is within the range from about 0.1 to 0.4 weight percent of the copolymer based on the dry weight of the cellulosic material and said retaining amount is within the range from about 1 to about 2 weight parts per weight part of said copolymer.

13. The cellulosic material of claim 11 wherein said cellulosic material is pulp.

14. The cellulosic material of claim 12 wherein the copolymer is a copolymer of ethylene and acrylic acid, the reaction product is a reaction product of epichlorohydrin and octadecylamine and which also contains from about 10 to about 50 pounds of alum per ton of cellulosic material.

* * * * *